United States Patent
Gu

(10) Patent No.: US 6,643,063 B2
(45) Date of Patent: Nov. 4, 2003

(54) DEINTERLEAVER WITH HIGH ISOLATION AND DISPERSION COMPENSATION AND 50/200GHZ INTERLEAVER AND DEINTERLEAVER

(75) Inventor: Shijie Gu, Sunnyvale, CA (US)

(73) Assignee: Oplink Communications, Inc., San Jose, CA (US)

( * ) Notice: Subject to any disclaimer, the term of this patent is extended or adjusted under 35 U.S.C. 154(b) by 6 days.

(21) Appl. No.: 10/004,266

(22) Filed: Nov. 14, 2001

(65) Prior Publication Data

US 2003/0090672 A1 May 15, 2003

(51) Int. Cl.[7] .......................... G02B 27/28; H04J 14/02; H04J 14/06
(52) U.S. Cl. ...................... 359/495; 359/494; 359/497; 359/498; 359/615; 359/122; 359/124
(58) Field of Search ................................ 359/494, 495, 359/496, 497, 498, 499, 615, 122, 124, 127

(56) References Cited

U.S. PATENT DOCUMENTS

| | | | | |
|---|---|---|---|---|
| 6,130,971 A | * | 10/2000 | Cao ............................. | 385/31 |
| 6,169,604 B1 | | 1/2001 | Cao ............................. | 356/519 |
| 6,169,626 B1 | | 1/2001 | Chen et al. .................. | 359/279 |
| 6,205,270 B1 | * | 3/2001 | Cao ............................. | 385/24 |
| 6,215,926 B1 | * | 4/2001 | Cao ............................. | 385/36 |
| 6,263,129 B1 | * | 7/2001 | Cao ............................. | 385/24 |
| 6,310,690 B1 | * | 10/2001 | Cao et al. .................... | 356/519 |
| 6,396,629 B1 | * | 5/2002 | Cao ............................. | 359/484 |
| 6,487,342 B1 | * | 11/2002 | Wu et al. ...................... | 385/39 |
| 6,493,141 B2 | * | 12/2002 | Cao et al. .................... | 359/497 |
| 2001/0028759 A1 | * | 10/2001 | Cao ............................. | 359/494 |
| 2002/0015228 A1 | * | 2/2002 | Cao et al. .................... | 359/497 |
| 2002/0122614 A1 | * | 9/2002 | Zhou et al. ................... | 385/15 |
| 2002/0171908 A1 | * | 11/2002 | Copner et al. ............... | 359/278 |
| 2002/0196540 A1 | * | 12/2002 | Zhao ............................ | 359/495 |

* cited by examiner

*Primary Examiner*—John Juba
(74) *Attorney, Agent, or Firm*—Lumen Intellectual Property Services, Inc.

(57) ABSTRACT

A deinterleaver includes three polarization interferometers and a dispersion compensator, the input light beam containing all channels passing through the dispersion compensator and the first polarization interferometer, the light beam being separated by a polarization beam splitter into an even channel beam and an odd channel beam with the even channel beam passing through a second polarization interferometer and the odd channel beam passing through a third polarization interferometer. A dispersion compensated deinterleaver as above in which all three polarization interferometers have pass bands corresponding to all channels and in which there are two output ports. A dispersion compensated deinterleaver in which the first polarization interferometer has pass bands for all channels, the second polarization interferometer has pass bands for even channels, the third polarization interferometer has pass bands for odd channels and in which there are four output ports.

26 Claims, 14 Drawing Sheets

| Optical Parameter | Symbol | Min. | Typical | Max. | Units |
|---|---|---|---|---|---|
| Insertion Loss | A | | 1.00 | 1.5 | dB |
| Passband Ripple | B | | 0.25 | 0.5 | dB |
| Crosstalk | C | | | -25 | dB |
| Isolation | D | | | -25 | dB |
| 0.5dB Passband Width | E | 27.5 | | | GHz |
| Rejection Width | F | 27.5 | | | GHz |
| Channel Spacing | G | | 1.00 | | GHz |

… and outputs two light beams 26 and 28, light beam 26 containing channels $\lambda_1, \lambda_3, \lambda_5$ … and light beam 28 containing channels $\lambda_2, \lambda_4, \lambda_6$ … Deinterleaver 30 receives light beam 26 and outputs two light beams 32 and 34, light beam 32 containing channels $\lambda_1, \lambda_5, \lambda_9$ … and light beam 34 containing channels $\lambda_3, \lambda_7, \lambda_{11}$. Deinterleaver 36 receives light beam 28 and outputs light beams 38 and 40, light beam 38 containing channels $\lambda_2, \lambda_6, \lambda_{10}$ … and light beam 40 containing channels $\lambda_4, \lambda_8, \lambda_{12}$. In the example shown in FIG. 2, deinterleaver 22 is a 50/100 GHz deinterleaver and deinterleavers 30 and 36 are 100/200 GHz deinterleavers. In FIG. 2, the deinterleavers 22, 30 and 36 are separate units and the light beams 26 and 28 are normally carried by optical fibers from deinterleaver 22 to deinterleavers 30 and 36. This arrangement is expensive and excessively bulky. There is a need for compact single unit deinterleavers having 4 outputs as above. There is also a need for compact single unit interleavers for receiving four sets of channels and outputting one combined set of channels.

DEINTERLEAVER WITH HIGH ISOLATION AND DISPERSION COMPENSATION AND 50/200GHZ INTERLEAVER AND DEINTERLEAVER

CROSS-REFERENCE TO RELATED APPLICATIONS

This application is related to pending U.S. patent application Ser. No. 09/874,925, filed Jun. 4, 2001, and Ser. No. 09/929,875, filed Aug. 13, 2001.

FIELD OF THE INVENTION

The present invention relates to fiber optic communications, and more particularly to fiber optic wavelength division multiplexers.

BACKGROUND OF THE INVENTION

Wavelength division multiplexing (WDM) and dense wavelength division multiplexing (DWDM) allow data transmission over multiple channels per fiber and thus greatly increase data transmission capacity per fiber. Typical channel spacing in DWDM systems has been progressively reduced in order to increase capacity even further. At the present time, 200 GHz, 100 GHz, and 50 GHz channel spacings are in use.

Interleavers and deinterleavers are commonly used to combine and separate channels. An interleaver receives two sets of channels at a given channel spacing and combines the two sets into one set having half the channel spacing. A deinterleaver performs the opposite function by receiving a set of channels at a given channel spacing and separating the received set into two sets of alternating channels with twice the channel spacing. Many types of interleaver and deinterleaver are known, including fused-fiber Mach-Zehnder interferometer, liquid crystals, birefringent crystals, Gires-Tournois interferometer (GTI) and others. The GTI based interleaver has many advantages including, very low insertion loss, uniform response over a wide range of wavelengths (flat-top spectrum), and minimal polarization dependence effect. However, the GTI based interleaver does have larger chromatic dispersion.

FIG. 1 shows the passband shape and characteristics of a 100/200 GHz deinterleaver. The input channel separation (spacing) is 100 GHz. The typical insertion loss is 1 dB, the maximum insertion loss is 1.5 dB. The 0.5 dB passband width is not less than 27.5 GHz. The −25 dB isolation rejection width is not less than 27.5 dB. The absolute value of the chromatic dispersion is not larger than 30 ps/nm. The specifications of a 100/200 GHz interleaver are the same as the deinterleaver, with the exception that in an interleaver −15 dB isolation is good enough.

As the required data capacity of a fiber is increased, more channels are required in a given bandwidth, and thus smaller channel spacing is required. Thus, as greater data capacity is required, interleavers and deinterleavers must function at smaller channel spacings, for example at 50/100 GHz and even at 25/50 GHz. In order to retain a high speed of data transmission of 10 Gbit/sec, the required specifications of an interleaver or deinterleaver with the narrower channel spacing are almost the same as for an interleaver or deinterleaver with wider channels spacing. As the channels spacings of interleaver or deinterleaver are reduced by half from 100/200 GHz to 50/100 GHz, the passband and stopband widths are reduced by half and the chromatic dispersion increases by a factor of four. Therefore, there exists a need for a deinterleaver with increased stopband width and with smaller chromatic dispersion.

FIG. 2 shows cascaded deinterleavers for separating input channels into four sets of output channels. Deinterleaver 22 receives a light beam 24 containing channels $\lambda_1, \lambda_2, \lambda_3$ …

OBJECTS AND ADVANTAGES

It is an object of the present invention to provide a deinterleaver that has high isolation and dispersion compensation.

It is an object of the present invention to provide an interleaver and deinterleaver that includes two optical filter stages to improve channel isolation and also includes dispersion compensation to compensate for chromatic dispersion introduced in the interleaver or deinterleaver.

It is also an object of the present invention to provide a dispersion compensated 1 to 4 deinterleaver.

It is also an object of the present invention to provide a dispersion compensated 4 to 1 interleaver.

SUMMARY OF THE INVENTION

The objects and advantages of the present invention are obtained in a dispersion compensated 1 to 2 deinterleaver and a dispersion compensated 2 to 1 interleaver in which the light containing signals of even channels passes through a dispersion compensator and two polarization interferometers having pass band for all channels, and the light containing signals of odd channels also passes through a dispersion compensator and two polarization interferometers having pass bands for all channels, resulting in greater stopband width and greater channel isolation.

The 1 to 2 deinterleaver includes a dispersion compensator and three polarization interferometers. Light containing signals for odd and even channels passes from a first port A through the dispersion compensator, through a first polarization interferometer, is divided by a polarization beam splitter into light containing signals of even channels and light containing signals of odd channels, the light containing even channels passing through a second polarization interferometer to a second port, and light containing the odd channels passing through a third polarization interferometer to a third port, wherein all three polarization interferometers have pass bands for odd and even channels.

The 2 to 1 interleaver uses the same optical components as does the 1 to 2 deinterleaver so that light containing signals for even channels passes from the second port through the second polarization interferometer, then through the first polarization interferometer and there combines with light containing signals of odd channels that has passed from the third port through the third polarization interferometer and the combined light containing signals for odd and even channels passes through the dispersion compensator to the first port.

The objects and advantages of the present invention are also obtained in a dispersion compensated 1 to 4 deinterleaver and a dispersion compensated 4 to 1 interleaver, in which the light containing signals of all channels passes through a dispersion compensator.

BRIEF DESCRIPTION OF THE DRAWINGS

The invention, together with objects and advantages thereof, may best be understood by reference to the following description of the presently preferred embodiments together with the accompanying drawings.

FIG. 7 shows the output spectrum of odd and even channels of a 50/100 GHz deinterleaver of FIG. 6a.

FIG. 9 shows the computed output spectrum of a 50/100 GHz deinterleaver as shown in FIG. 8a.

DETAILED DESCRIPTION

The interleavers and deinterleavers of the present invention are based on polarization interferometers and in addition are dispersion compensated.

The theory of polarization interferometers has been discussed by the present inventor in the above-referenced co-pending patent application Ser. No. 09/929,875, entitled "GIRES-TOURNOIS INTERFEROMETER WITH FARADAY ROTATORS FOR OPTICAL SIGNAL INTERLEAVER".

Figure 3A:
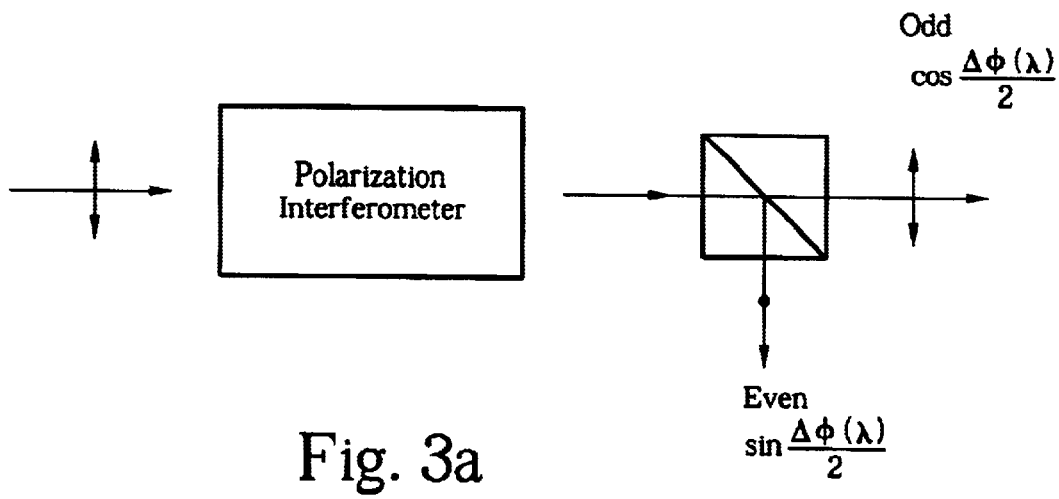
FIGS. 3a and 3b illustrate the working principle of a polarization interferometer based interleaver.

FIG. 3a shows the working principle of a polarization interferometer based deinterleaver. The incident light beam E includes the signals of all channels and is horizontally polarized. Suppose the incident beam E has zero phase delay and unit amplitude, i.e. E=1. When the beam passes through or is reflected from the polarization interferometer, the polarization interferometer changes the polarization status of the beam E from linear polarizations to elliptical polarizations which are dependent on the wavelength λ. When the light beam E travels to a polarization beam splitter (PBS), one portion of the beam passes through the PBS. This portion of the beam includes the signals of the odd channels and has horizontal polarization that is parallel to the polarization of the incident beam. The expression for the amplitude and phase for the beam containing odd channels is $$\cos\frac{\Delta\phi(\lambda)}{2}e^{i\psi_I(\lambda)}. \quad (1)$$

Another portion of the beam is reflected by the diagonal plane of the PBS. This portion of the beam includes signals of the even channels and has vertical polarization that is perpendicular to the polarization of the incident beam. The expression for the amplitude and phase for the beam containing even channels is $$\sin\frac{\Delta\phi(\lambda)}{2}e^{i\psi_I(\lambda)}. \quad (2)$$

Figure 3B:
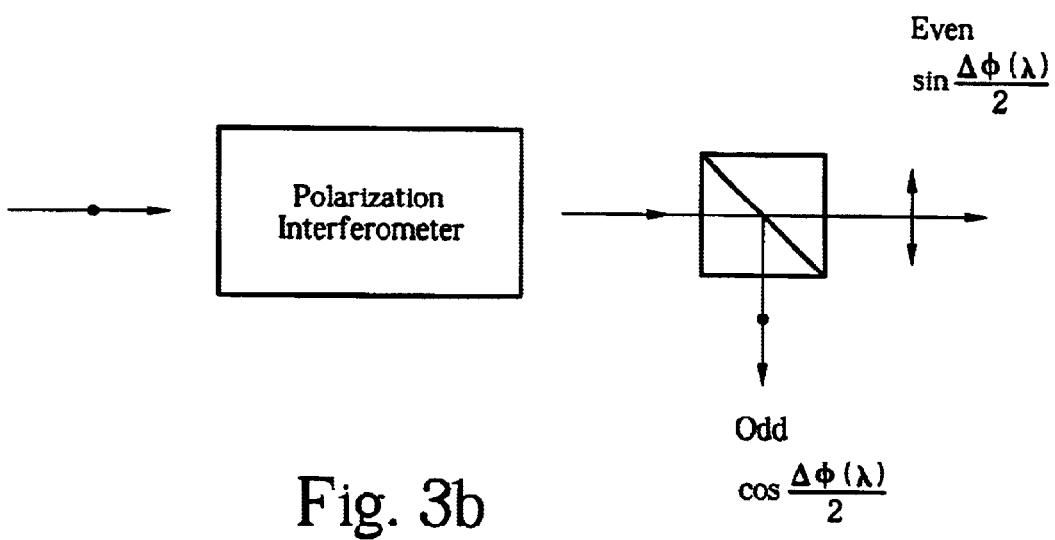

FIG. 3b is the same as FIG. 3a, except for the polarization of the incident beam. In FIG. 3b the incident beam has vertical polarization. In this case, the portion of the beam passing through the PBS has horizontal polarization that is perpendicular to the polarization of the incident beam. The expression for its amplitude and phase is the expression (2). This means that this portion of the beam includes the signals of the even channels. The portion of the beam that is reflected by the PBS has vertical polarization that is parallel to the direction of polarization of the incident beam. The expression for its amplitude and phase is expression (1). This portion of the beam includes the signals of the odd channels. Therefore, of the two light beams emerging from the PBS, the one that has polarization parallel to the polarization of the incident beam and that has amplitude and phase as in expression (1) contains the signals of odd channels, and the emerging light beam that has polarization perpendicular to the polarization of the incident beam and that has amplitude and phase that is described by expression (2) includes the signals of even channels.

Figure 1:
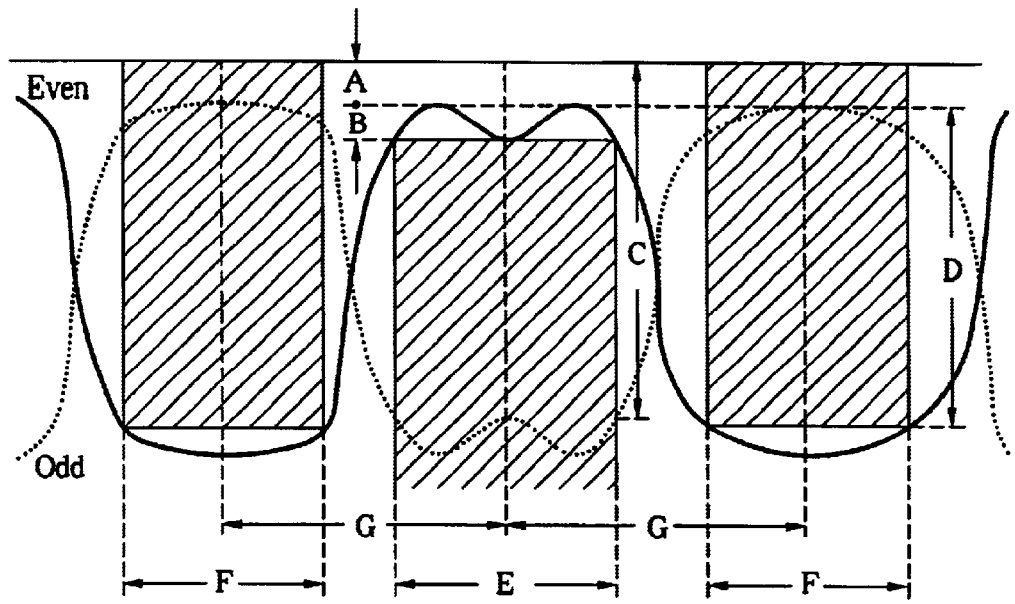
FIG. 1 shows the passband shape and characteristics of a 100/200 GHz deinterleaver.
Figure 2:
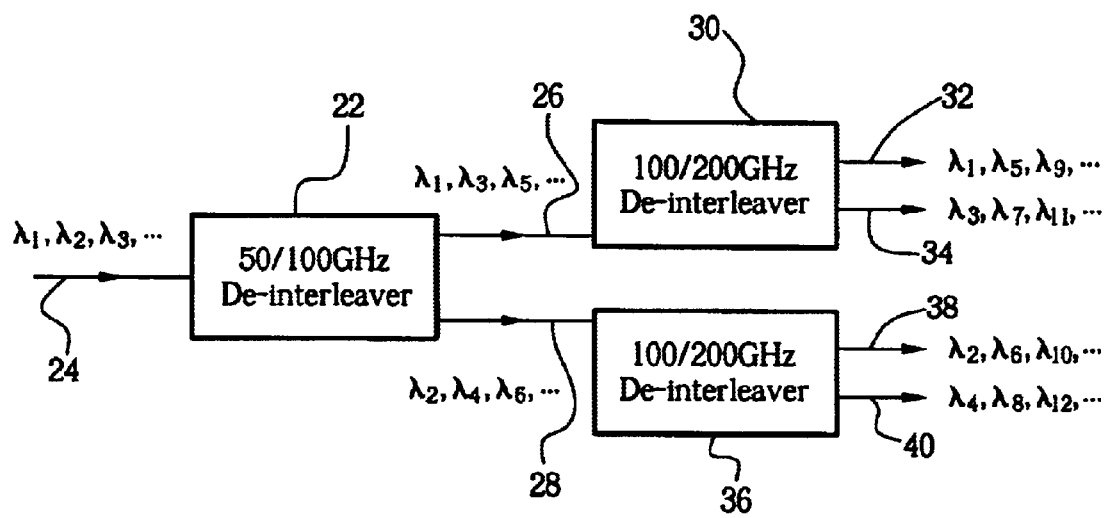
FIG. 2 shows a 50/100 deinterleaver cascaded with two 100/200 GHz deinterleavers.
Figure 4:
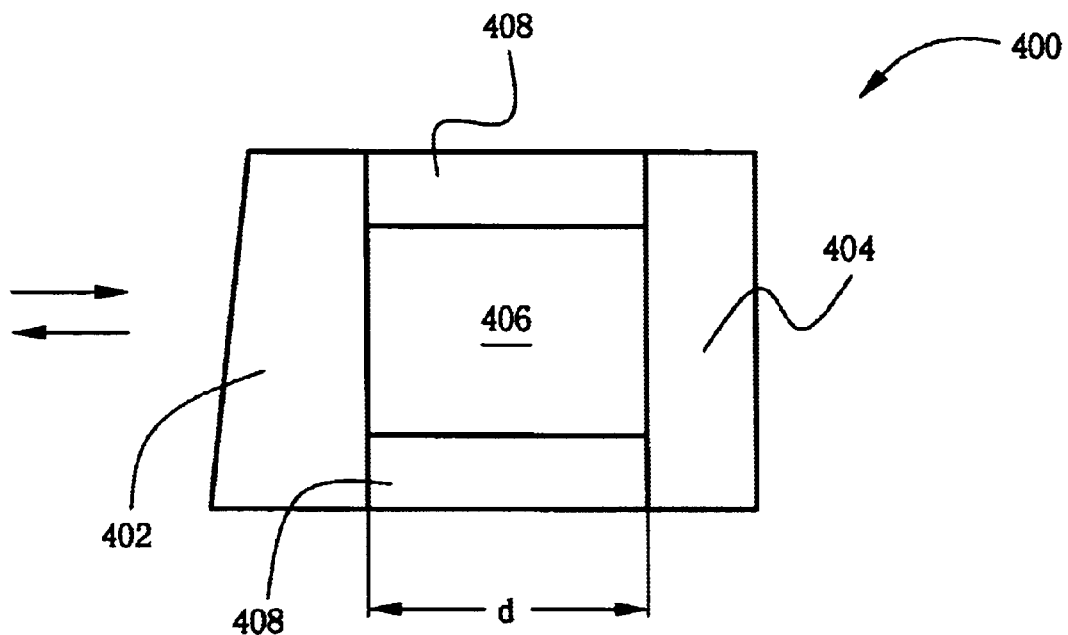
FIG. 4 shows a cross section of a Gires-Tournois interferometer.

FIG. 4 shows a cross section of a Gires-Tournois interferometer (GTI) 400. The GTI 400 includes a partially reflective mirror 402 that is spaced apart from and parallel to a 100% reflective mirror 404. There is a cavity 406 between the partially reflective mirror 402 and the 100% reflective mirror 404. As indicated in FIG. 2, d is the cavity length. The partially reflective mirror 402 allows light to enter and leave the cavity 406. The spacers 408 are made of ultra-low expansion material. The amplitude response of GTI 400 is flat (i.e. independent of wavelength) and the phase response is $$\psi(\lambda) = -2\tan^{-1}\left[\frac{1+\sqrt{R_1}}{1-\sqrt{R_1}}\tan\left(\frac{2\pi d}{\lambda}\right)\right] \quad (3)$$

where λ is wavelength; $R_1$ is power reflectivity of the partially reflective mirror; d is the cavity length and $\frac{2\pi d}{\lambda}$ is the single pass phase delay in the cavity of the GTI.

Figure 5:
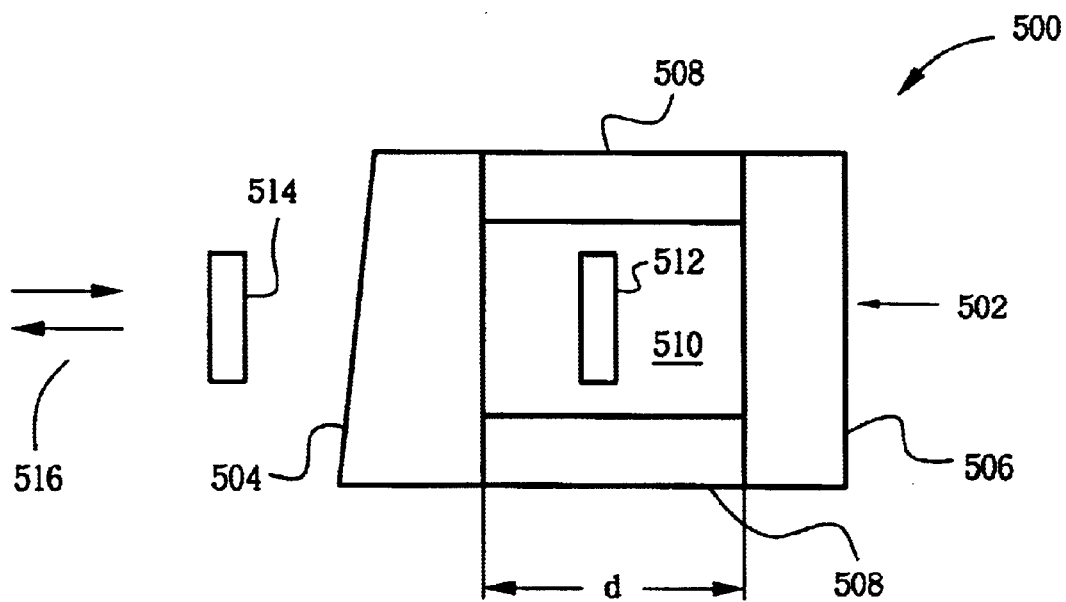
FIG. 5 shows a cross section of a polarization interferometer.

FIG. 5 shows a cross section of a polarization interferometer 500. The polarization interferometer 500 includes a Gires-Tournois interferometer (GTI) 502 consisting of a partially reflective mirror 504 and a 100% reflective mirror 506, separated by a cavity 510 where the cavity length is d. The polarization interferometer also includes two Faraday rotators (garnets) or two wave plates, a 45 degree garnet (or quarter wave plate) 512 inside the cavity 510 and a 22.5 degree garnet (or ⅛ wave plate) 514 in front of the GTI in the path of light 516 entering and leaving the cavity 510. The polarization interferometer of FIG. 5 has phase difference $\Delta\phi(\lambda)$ given by $$\Delta\phi(\lambda) = -2\tan^{-1}\left[\frac{1+\sqrt{R_1}}{1-\sqrt{R_1}}\tan\left(\frac{2\pi L}{\lambda}-\frac{\pi}{4}\right)\right] + \quad (4)$$

$$2\tan^{-1}\left[\frac{1+\sqrt{R_1}}{1-\sqrt{R_1}}\tan\left(\frac{2\pi L}{\lambda}+\frac{\pi}{4}\right)\right] - \frac{\pi}{2}$$

and phase delay $\psi_I(\lambda)$ given by $$\psi_I(\lambda) = \quad (5)$$

$$-\tan^{-1}\left[\frac{1+\sqrt{R_1}}{1-\sqrt{R_1}}\tan\left(\frac{2\pi L}{\lambda}-\frac{\pi}{4}\right)\right] - \tan^{-1}\left[\frac{1+\sqrt{R}}{1-\sqrt{R_1}}\tan\left(\frac{2\pi L}{\lambda}+\frac{\pi}{4}\right)\right]$$

where L is the effective optical length of the cavity. For a 50/100 GHz interleaver or deinterleaver, L=1.499 mm and $R_1$=18.5%±0.5%.

Figure 6A:
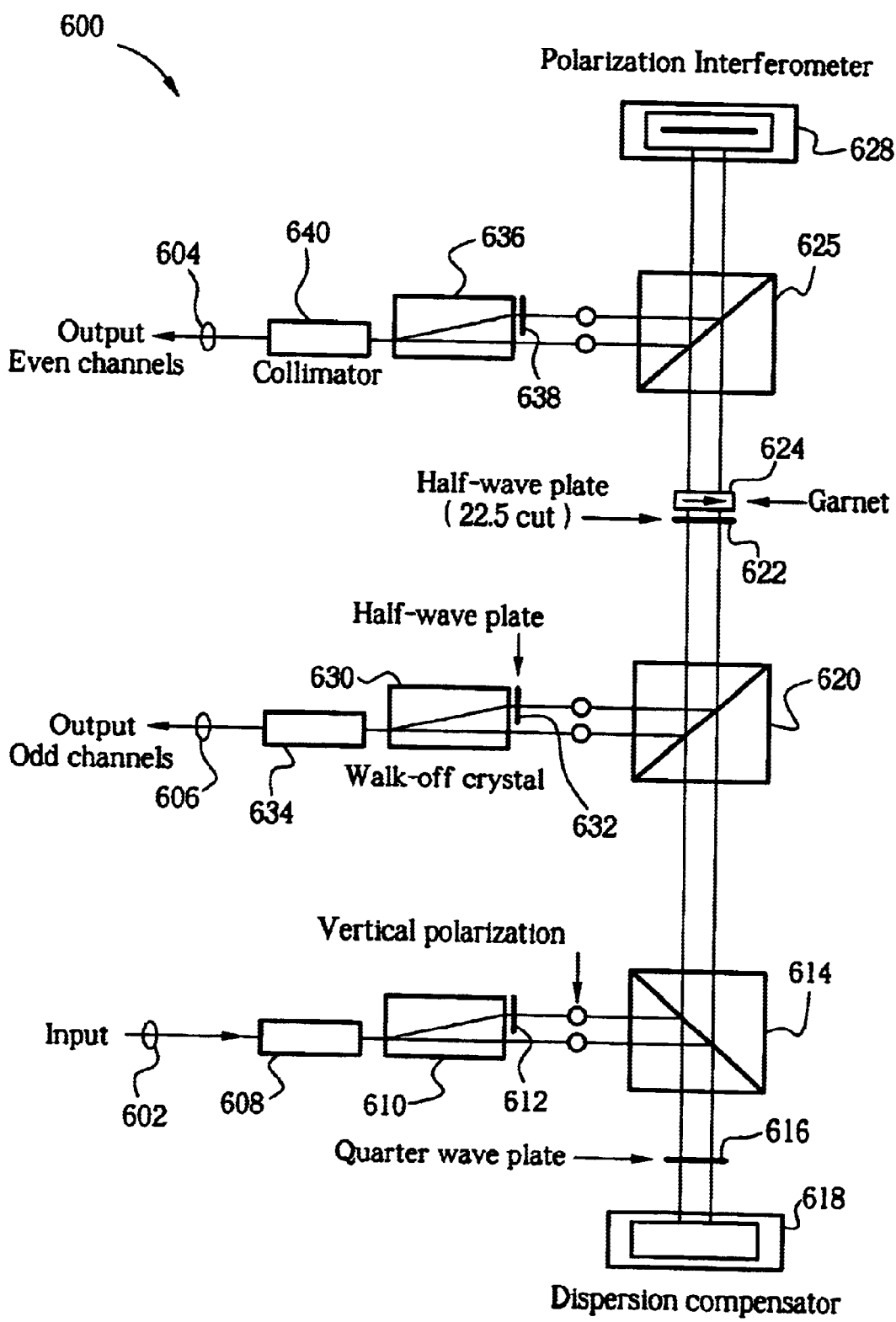
FIG. 6a shows a schematic of a polarization interferometer based deinterleaver with dispersion compensation.

FIG. 6a shows a deinterleaver with dispersion compensation as disclosed in the above-referenced co-pending patent application Ser. No. 09/929,875, entitled "GIRES-TOURNOIS INTERFEROMETER WITH FARADAY ROTATORS FOR OPTICAL SIGNAL INTERLEAVER". The 1 to 2 deinterleaver 600 receives an input light beam containing information signals for even channels and odd channels at port 602 and outputs two light beams, one light beam for even channels at port 604 and one light beam for odd channels at port 606. The input light passes through collimator 608, and passes through walk-off crystal 610. The walk-off crystal 610 separates the light beam into a portion that is polarized in the vertical direction and a portion that is polarized in the horizontal direction. The latter portion is rotated to the vertical direction by half wave plate 612. The two portions of the light beam are reflected by polarization beam splitter (PBS) 614. The light then passes through quarter wave plate 616 and becomes circularly polarized. The light then enters the dispersion compensator 618. Dispersion compensator 618 is a Gires-Tournois interferometer that changes the phase of the light by $\psi_c(\lambda)$ as given by equation (6). The circularly polarized light passes through quarter wave plate 616 again and emerges from the quarter wave plate 616 with polarization changed to horizontal polarization. The light then passes through PBS 614, PBS 620, 22.5 cut half wave plate 622, garnet 624 and PBS 626 to polarization interferometer (PI) 628. The direction of polarization is rotated 45 degrees by the 22.5 cut half wave plate 622 and −45 degrees by garnet 624 so that light emerges from garnet 624 horizontally polarized. PI 628 is as shown in FIG. 5

After reflection in PI 628 the light containing even channels is reflected in PBS 626 towards walk-off crystal 636. Half wave plate 638 rotates the direction of polarization of a portion of the light from vertical to horizontal. Walk-off crystal 636 combines the two portions to provide a depolarized light beam containing even channels to collimator 640 and port 604.

After exiting PI 628, the light for odd channels passes through PBS 626, through garnet 624, and through 22.5 cut half wave plate 622. The combination of garnet 624 and half-wave plate 622 rotates the direction of polarization from horizontal to vertical, the garnet rotating the polarization 45 degrees and the half wave plate rotating the direction of polarization another 45 degrees. The vertically polarized light for odd channels is reflected in PBS 620 to walk-off crystal 630. Half wave plate 632 rotates the direction of polarization of a portion of the light from vertical to horizontal. The walk-off crystal 630 combines the two portions of the light to provide a depolarized output light beam containing signals for odd channels to collimator 634 and port 606.

The dispersion compensator 618 is a GTI as shown in FIG. 4. The reflectivity of the partially reflective mirror is $R_2$ and the phase response of the dispersion compensator 618 is $$\psi_C(\lambda) = -2\tan^{-1}\left[\frac{1+\sqrt{R_2}}{1-\sqrt{R_2}}\tan\left(\frac{2\pi d}{\lambda}\right)\right] \quad (6)$$

The group delay $\tau(\lambda)$ (ps) and dispersion $D(\lambda)$ (ps/nm) are respectively, $$\tau(\lambda) = \frac{0.01\lambda^2}{6\pi}\frac{d\psi_c(\lambda)}{d\lambda} \quad (7)$$

$$D(\lambda) = 10^{-3}\frac{d\tau(\lambda)}{d\lambda} \quad (8)$$

The total phase shift of the deinterleaver with dispersion compensation is $$\psi_T(\lambda)=\psi_I(\lambda)+\psi_C(\lambda) \quad (9)$$

For a 50/100 GHz deinterleaver without dispersion compensation, the dispersion value is ±50 ps/nm. This value is reduced to ±6 ps/nm for a 50/100 GHz deinterleaver with dispersion compensation as shown in FIG. 6a. The same is true for the interleaver of FIG. 6b.

Figure 6B:
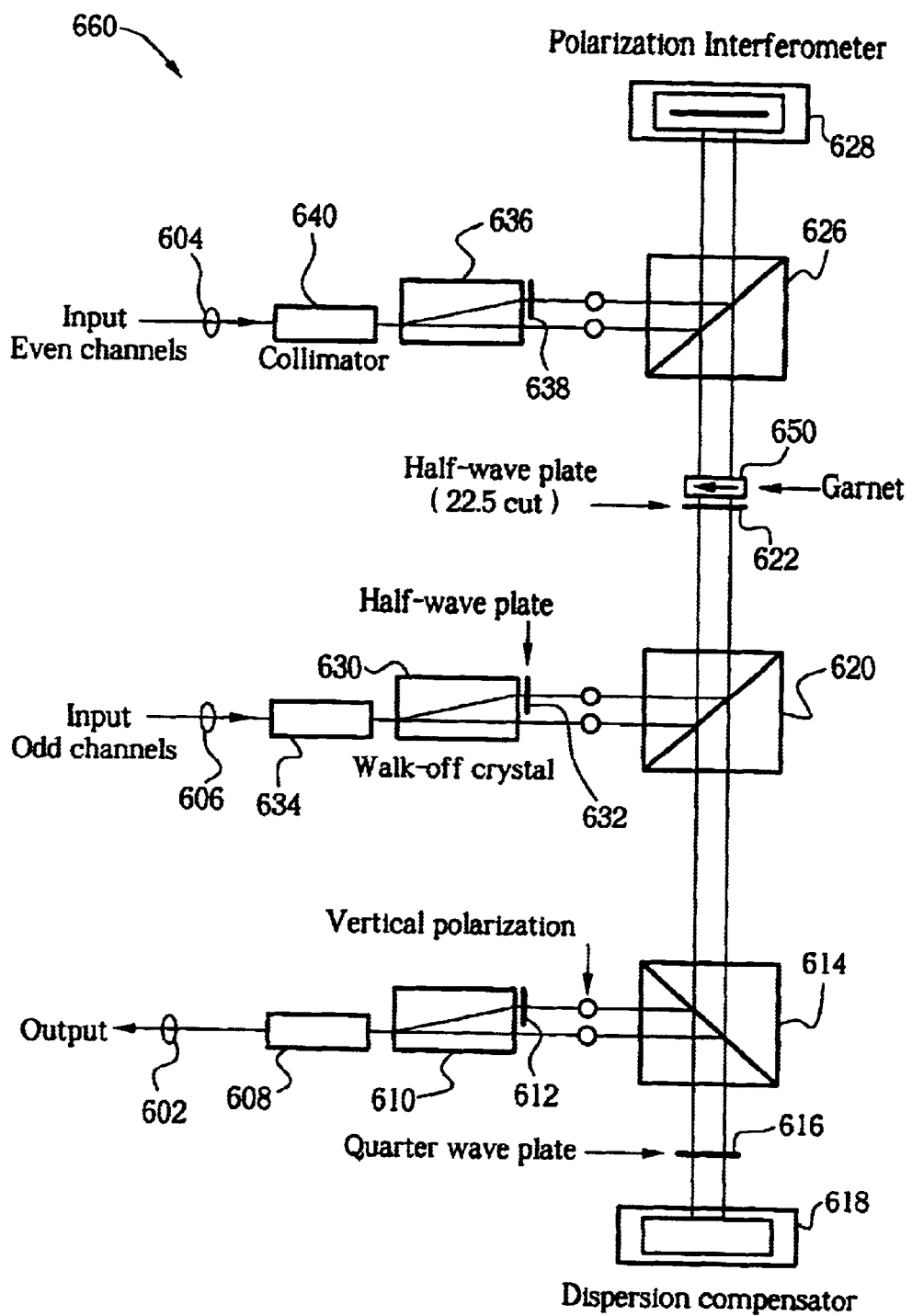
FIG. 6b shows a schematic of a polarization interferometer based interleaver with dispersion compensation.

FIG. 6b shows a polarization interferometer based interleaver that is dispersion compensated. Where a numerical identifier in FIG. 6b is the same as a numerical identifier in FIG. 6a the identified component is the same. All of the numerical identifiers in FIG. 6a are carried over into FIG. 6b with one exception. The Garnet 624 in FIG. 6a has been replaced by garnet 650 in FIG. 6b only to show that the garnet has been rotated through 180 degrees about an axis perpendicular to the plane of the drawing. The change in orientation of the garnets is shown in that the garnet 624 in FIG. 6a is represented by a symbol in which an arrow points to the right, and garnet 650 in FIG. 6b is represented by a symbol in which an arrow points to the left. This change in the orientation of garnet 650 allows all of the optical paths to be reversed in FIG. 6b from those in FIG. 6a. Thus, in FIG. 6b light containing even channels is input at port 604, light containing odd channels is input at port 606 and the combined light containing even and odd channels is output at port 602.

Figure 7:
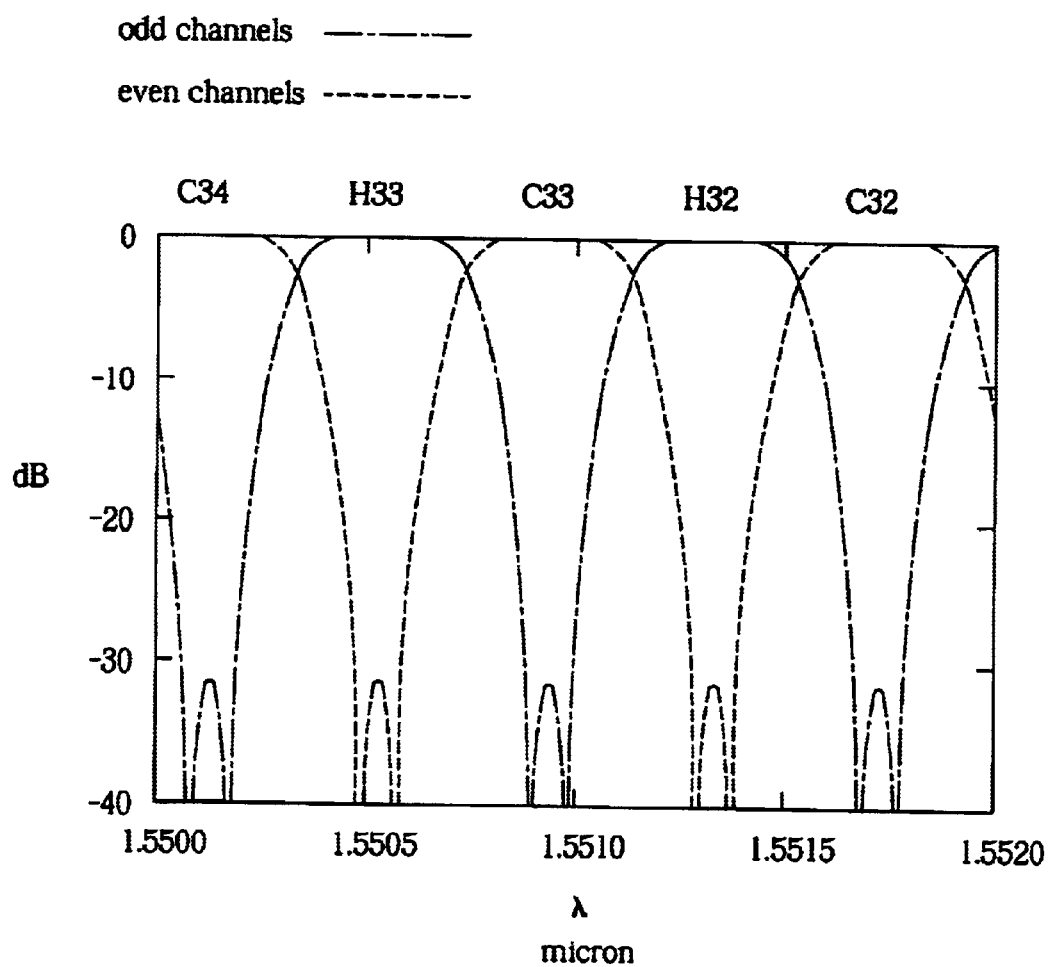

FIG. 7 shows the output spectrum of odd and even channels of a 50/100 GHz deinterleaver of the type shown in FIG. 6a. In FIG. 7 the 0.5 dB passband width and −25 dB isolation stopband, width are 35 GHz and 18.8 GHz, respectively. For some applications in DWDM, the −25 dB isolation stopband width is required to be not less than 20 GHz.

Figure 8A:
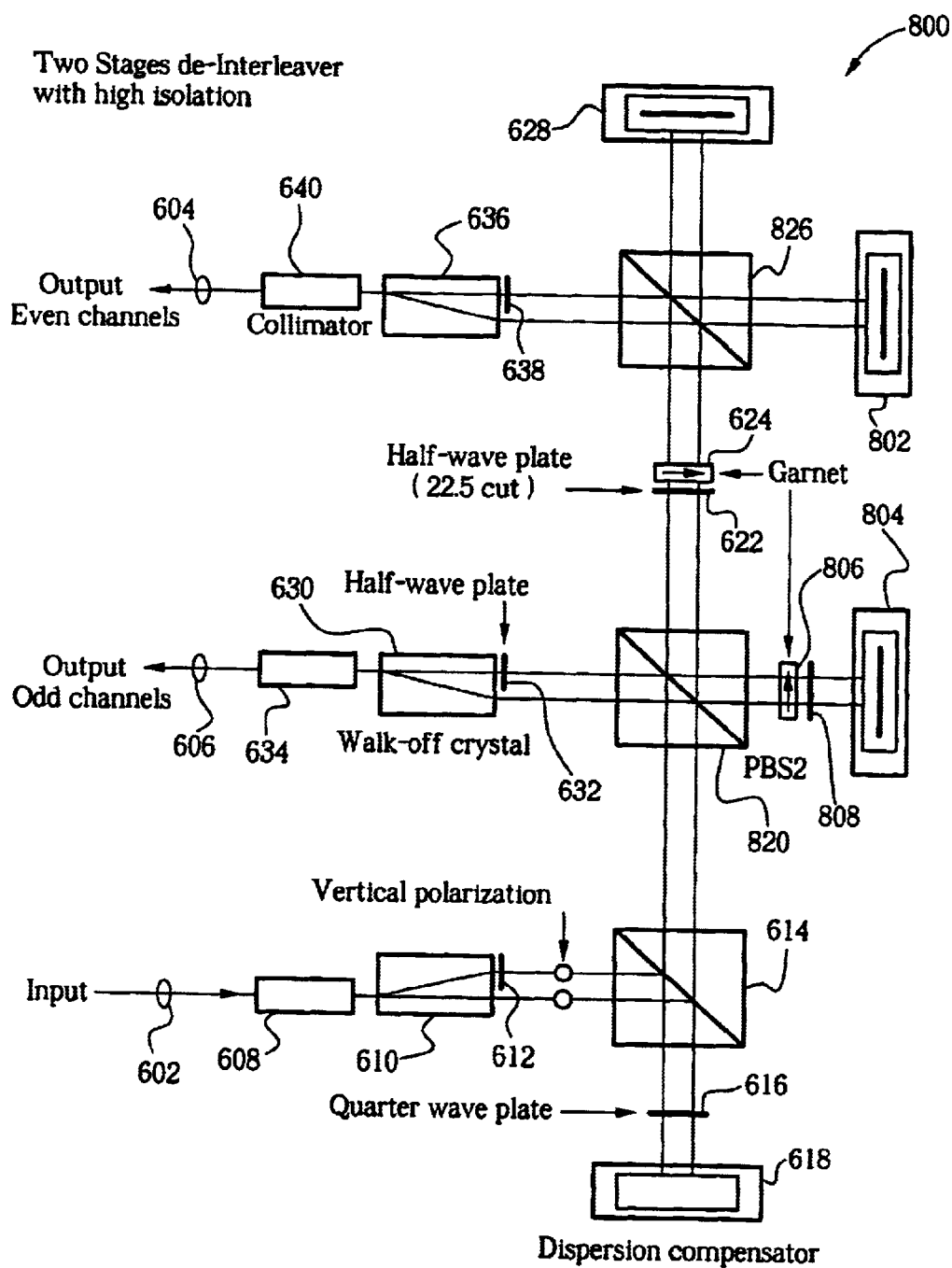
FIG. 8a shows a schematic representation of a 1 to 2 deinterleaver in accordance with the present invention.

FIG. 8a shows a schematic of a deinterleaver in accordance with the present invention. The 1 to 2 deinterleaver 800 receives an input light beam containing signals for even channels and odd channels at port 602 and outputs two light beams, one light beam containing even channels at port 604 and another light beam containing odd channels at port 606. The channel spacing at port 602 may be 50 GHz with the output channel spacing being 100 GHz, as in a 50/100 GHz deinterleaver. Likewise, a 25/50 GHz deinterleaver has 25 GHz channel spacing at port 602 and 50 GHz channel spacing at port 604 and at port 606.

The deinterleaver 800 includes dispersion compensator 618. The dispersion compensator 618 is a Gires-Tournois interferometer as shown in FIG. 4.

The deinterleaver 800 further includes polarization interferometers 628, 802, and 804. These polarization interferometers are as shown in FIG. 5.

In FIG. 8a, an input light beam containing signals for even and odd channels is received by the deinterleaver 800 at port 602, passes through collimator 608, and passes through walk-off crystal 610. The walk-off crystal 610 separates the light beam into a portion that is polarized in the vertical direction and a portion that is polarized in the horizontal direction. The latter portion is rotated to the vertical direction by half wave plate 612. The two portions of the light beam are reflected by polarization beam splitter (PBS) 614. The light then passes through quarter wave plate 616 and becomes circularly polarized. The light then enters dispersion compensator 618. Dispersion compensator 618 is a Gires-Tournois interferometer that changes the phase of the light by $\psi_C(\lambda)$ as given by equation (6). The circularly polarized light passes through quarter wave plate 616 again and emerges from quarter wave plate 616 with polarization changed to plane polarization in the horizontal direction. The light then passes through PBS 614, PBS 820, 22.5 cut half wave plate 622, garnet 624 and PBS 826 to polarization interferometer (PI) 628. The direction of polarization is rotated 45 degrees by the 22.5 cut half wave plate 622 and −45 degrees by garnet 624 so that light emerges from garnet 624 polarized in the horizontal direction. PI 628 is a polarization interferometer as shown in FIG. 5 and has pass bands for even and odd channels. The light for even and odd channels is reflected by PI 628.

The light containing even channels is reflected by PBS 826 to PI 802, emerges from PI 802 with the direction of polarization changed to horizontal, passes through PBS 826 towards walk-off crystal 636. Half wave plate 638 rotates the direction of polarization of a portion of the light from horizontal to vertical. Walk-off crystal 636 combines the two portions to provide a depolarized light beam containing even channels to collimator 640 and port 604.

After exiting PI 628, the light containing odd channels passes through PBS 826, through garnet 624, and through 22.5 cut half wave plate 622. The combination of garnet 624 and 22.5 cut half wave plate 622 rotates the direction of polarization through ninety degrees from horizontal to vertical, the garnett 624 rotating 45 degrees and the 22.5 cut half wave plate rotating another 45 degrees. The vertically polarized light for odd channels is reflected in PBS 820, passes through garnet 806 and half wave plate 808 to PI 804. The garnet 806 rotates the direction of polarization through 45 degrees and the half wave plate does likewise so that the light becomes horizontally polarized. The light emerges from PI 804 still horizontally polarized, passes through half wave plate 808, garnet 806, PBS 820 to walk-off crystal 630. Half wave plate 632 rotates the direction of polarization of a portion of the light from horizontal to vertical. Walk-off crystal 630 combines the two portions to provide a depolarized beam containing odd channels to collimator 634 and port 606.

The function of deinterleaver 800 may be stated briefly as follows. In deinterleaver 800, a light beam containing signals for even and odd channels passes through dispersion compensator 618, through PI 628, is divided into even and odd light beams by PBS 826, after which the light containing signals of even channels passes through PI 802, is depolarized and is outputted at port 604, while the light beam containing signals of odd channels passes through PI 804, is depolarized and outputted at port 606. Thus, all of the channels pass through dispersion compensator 618 and through two polarization interferometers.

The expression for the amplitude and phase of the light beam containing odd channels, outputted at port 606, is $$\cos^2\frac{\Delta\phi(\lambda)}{2}e^{i2\psi_I(\lambda)}.$$

The expression for the amplitude and phase of the light beam containing even channels, outputted at port 604, is $$\sin^2\frac{\Delta\phi(\lambda)}{2}e^{i2\psi_I(\lambda)}.$$

Figure 9:
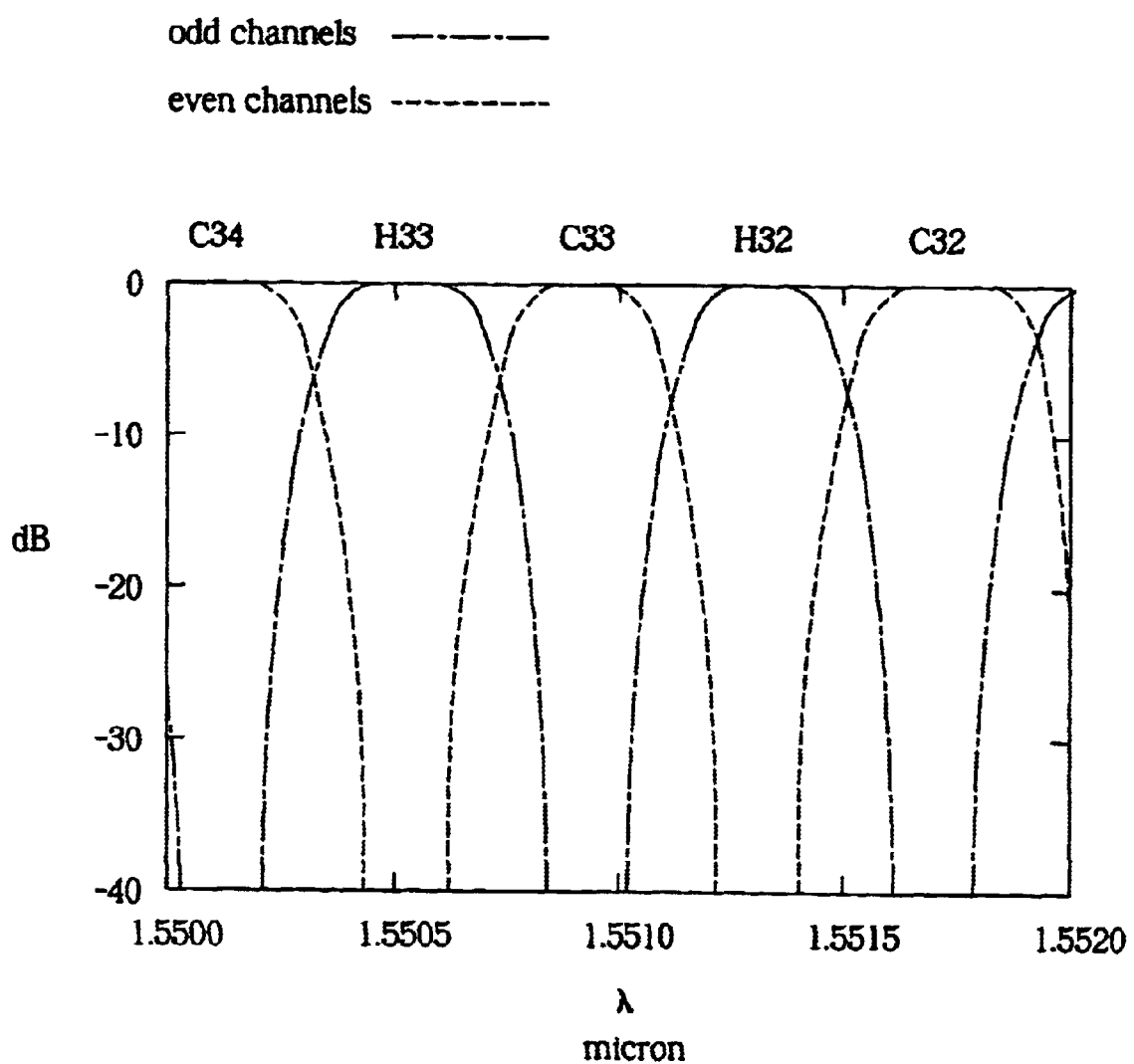

FIG. 9 illustrates the calculated output spectrum of odd and even channels of a 50/100 GHz deinterleaver in accordance with the invention as shown in FIG. 8a. In FIG. 9, the 0.5 dB passband width is 30 GHz and the −25 dB isolation stopband width is 30 GHz. The −40 dB isolation stop band width of this deinterleaver is 21.5 GHz. Thus this deinterleaver can meet the requirements for most applications in DWDM.

Without dispersion compensation, the absolute value of dispersion for the 50/100 GHz deinterleaver with high isolation is larger than 100 ps/nm, but with dispersion compensation this value drops to 24 ps/nm. In the calculation of the dispersion compensation, the cavity length d in the dispersion compensator was assumed to be d=2.998 mm and the reflectivity of the partially reflective mirror 402 in FIG. 4 was assumed to be 1.44%.

Figure 8B:
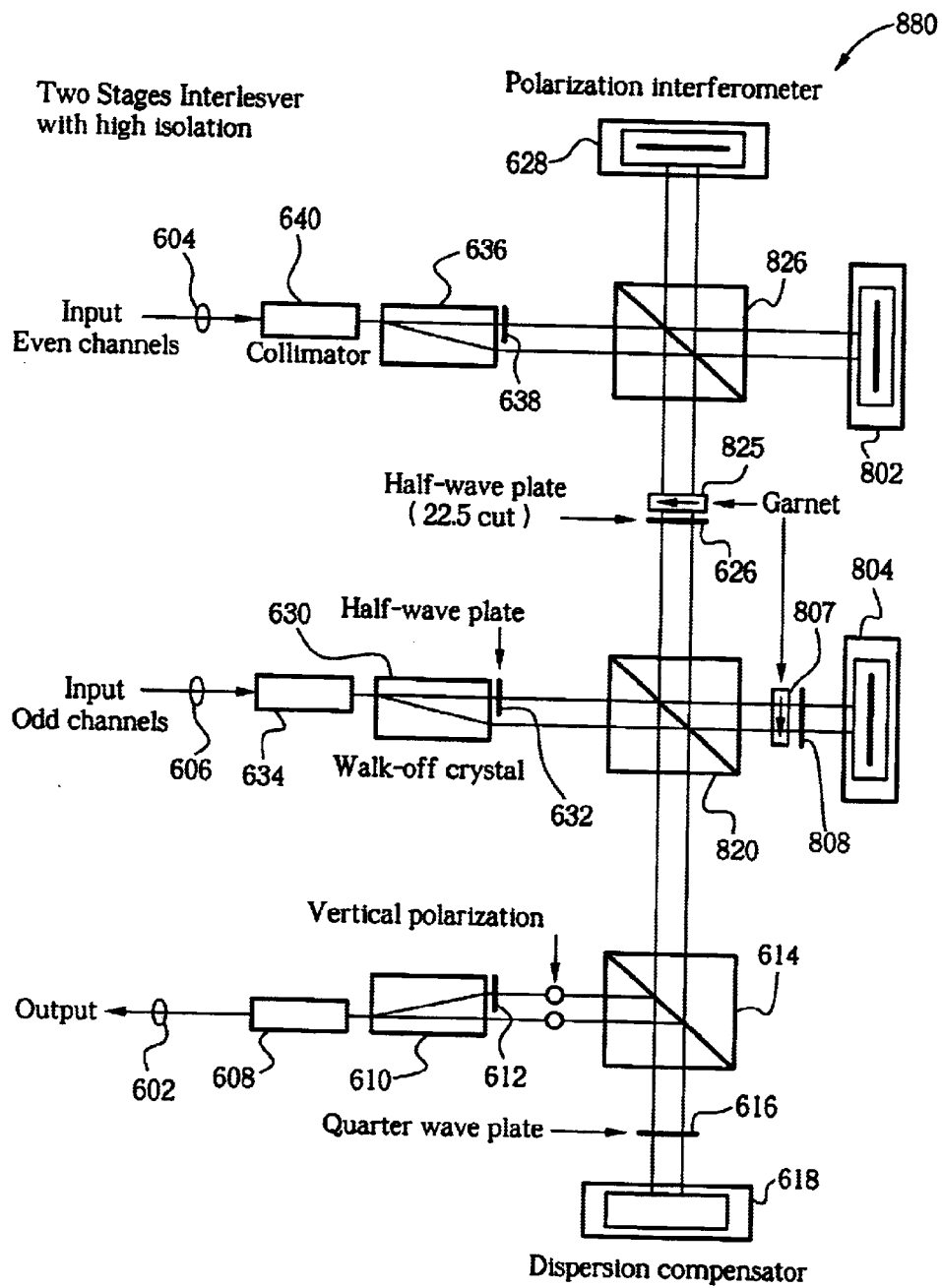
FIG. 8b shows a schematic representation of 2 to 1 interleaver in accordance with the present invention.

FIG. 8b shows a 2 to 1 interleaver 880 in accordance with the present invention. In FIG. 8b, it can be seen that the interleaver 880 contains the same arrangement of components as the deinterleaver of FIG. 8a. In FIG. 8b, the garnets 807 and 825 are rotated 180 degrees relative to the garnets 808 and 624 in FIG. 8a, the axis of rotation being vertical to the plane of the page. This is indicated by the reversed direction of the arrow symbol in garnets 807 and 825 in FIG. 8b relative to the arrow directions in FIG. 8a. With this change, the direction of travel of light in the entire apparatus can be reversed, with the even channel light beam entering at port 604, odd channel light beam entering at port 606 and the combination even channel and odd channel light being outputted at port 602. In the interleaver of FIG. 8b, the light beam containing signals of even channels passes through two polarization interferometers, PI 802 and PI 628, and also through dispersion compensator 618. The light containing signals of odd channels passes through PI 804 and PI 628 and dispersion compensator 618. Thus, all channels are dispersion compensated and pass through two polarization interferometers.

Walk-off crystal 610 together with half wave plate 612 act as a polarizer in FIG. 8a and act as a depolarizer in FIG. 8b and thus the combination of walk-off crystal 610 with half wave plate 612 may be called a polarizer/depolarizer. Likewise, walk-off crystal 630 and half wave plate 632 and walk-off crystal 636 and half wave plate 638 constitute polarizer/depolarizers.

Figure 10A:
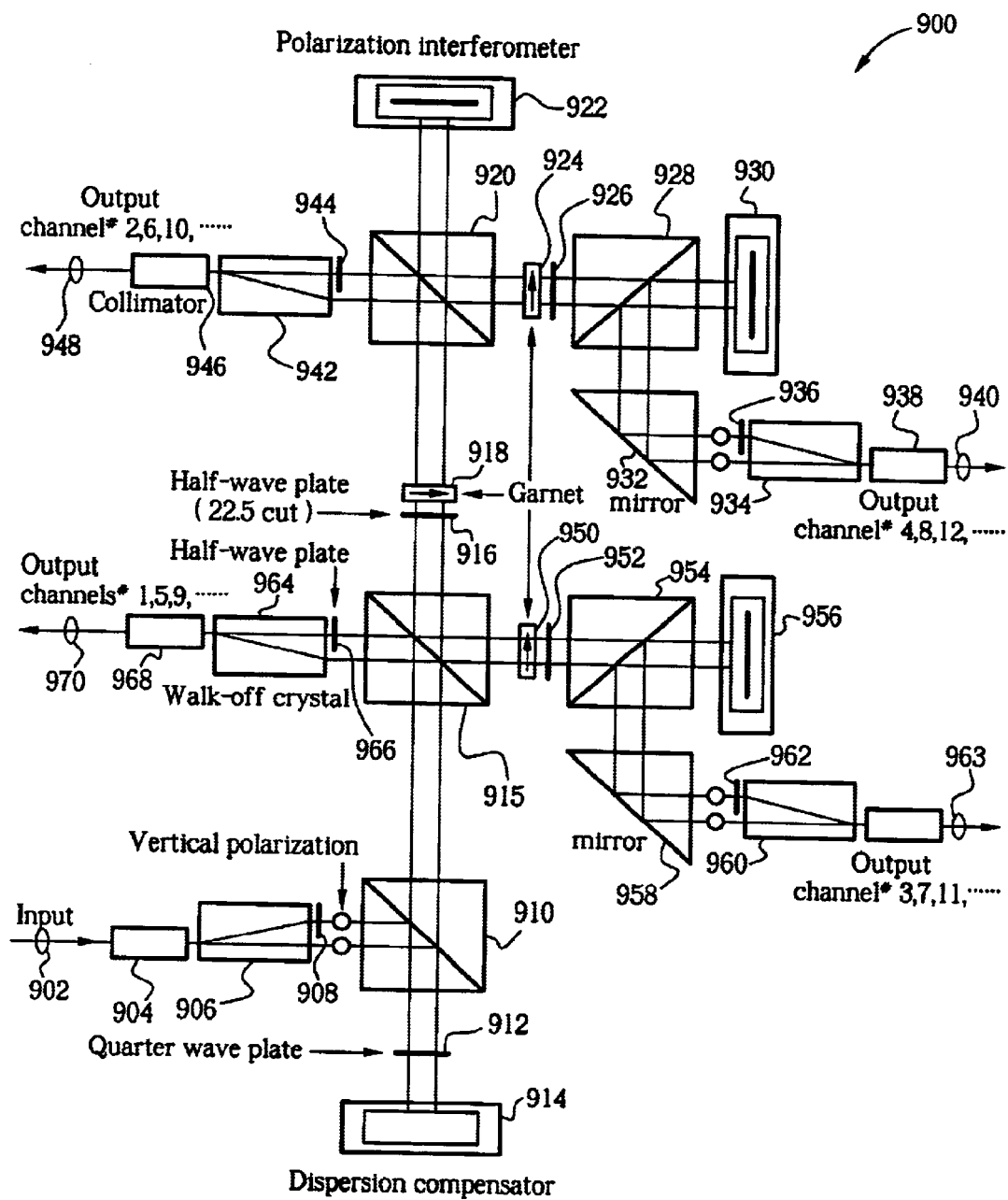
FIG. 10a shows a schematic representation of a 1 to 4 deinterleaver in accordance with the present invention.

FIG. 10a shows a 1 to 4 deinterleaver 900 in accordance with the present invention. The 1 to 4 deinterleaver 900 can be a 50/200 GHz deinterleaver, for example. An input light beam containing signals for channels 1, 2, 3, 4, 5, . . . is received by the deinterleaver 900 at port 902, passes through collimator 904, and passes through walk-off crystal 906. Walk-off crystal 906 separates the light beam into a portion that is polarized in the vertical direction and a portion that is polarized in the horizontal direction. The latter portion is rotated to the vertical direction by half wave plate 908. The two portions of the light beam are reflected by polarization beam splitter (PBS) 910. The light passes through quarter wave plate 912 and becomes circularly polarized. The light then enters dispersion compensator 914. Dispersion compensator 914 is a Gires-Tournois interferometer that changes the phase of the light by $\psi_c(\lambda)$ as given by equation (6). The circularly polarized light then passes through quarter wave plate 912 again and emerges from quarter wave plate 912 with polarization changed to plane polarization in the horizontal direction. The light then passes through PBS 910, PBS 915, 22.5 cut half wave plate 916, garnet 918 and PBS 920 to Polarization interferometer 922. The 22.5 cut half wave plate rotates the direction of polarization by 45 degrees and the garnet rotates the direction of polarization in the opposite direction so that horizontal polarization is maintained. PI 922 has pass bands for channels 1, 2, 3, 4, 5 . . . The light emerges from PI 922 and is divided by PBS 920 into a vertically polarized light beam containing signals for even channels and a horizontally polarized beam containing signals of odd channels.

The vertically polarized light beam containing signals of even channels is reflected by PBS 920 and passes through garnet 924 and half wave plate 926, emerges from half wave plate 926 plane polarized in the horizontal direction, passes through PBS 928 to PI 930. PI 930 has pass bands for channels 2, 4, 6, 8, 10, . . . The light beam for even channels emerges from PI 930 and is divided by PBS 928 into a vertically polarized beam for channels 4, 8, 12, . . . and a horizontally polarized beam for channels 2, 6, 10, . . . The beam for channels 4, 8, 12, . . . is reflected by PBS 928, and is reflected by mirror 932 towards walk-off crystal 934. Half wave plate 936 rotates the direction of polarization of a portion of the light from vertical to horizontal. Walk-off crystal combines the two portions to provide a depolarized beam to collimator 938 and port 940.

The horizontally polarized light beam containing signals of channels 2, 6, 10, . . . passes through PBS 928, passes through half wave plate 926 and garnet 924 with polarization unchanged, through PBS 920, towards walk-off crystal 942. Half wave plate 944 rotates the direction of polarization of a portion of the light from horizontal to vertical. Walk-off crystal 942 combines the vertical and horizontal light to provide a depolarized beam containing signals for channels 2, 6, 10, . . . to collimator 946 and port 948.

After leaving PI 922, the light containing signals of odd channels passes through PBS 920, passes through garnet 918 and 22.5 cut half wave plate 916, emerges from half wave plate 916 plane polarized in the vertical direction, is reflected in PBS 915, passes through garnet 950 and half wave plate 952, emerges from half wave plate 952 plane polarized in the horizontal direction, passes through PBS 954 to PI 956. PI 956 has pass bands for channels 1, 3, 5, 7, 9, 11 . . . The light beam for odd channels emerges from PI 956 and is divided by PBS 954 into a vertically polarized beam for channels 3, 7, 11, . . . and a horizontally polarized beam for channels 1, 5, 9, . . . The vertically polarized beam for channels 3, 7, 11, . . . is reflected by PBS 954, is reflected by mirror 958 towards walk-off crystal 960. Half wave plate 962 rotates the direction of polarization of a portion of the light from vertical to horizontal. Walk-off crystal 960 combines the vertical and horizontally polarized light to provide a depolarized beam containing signals for channels 3, 7, 11, . . . to collimator 960 and port 963.

After leaving PI 956, the light for channels 1, 5, 9, . . . passes through PBS 954, through half wave plate 952 and garnet 950, PBS 915 towards walk-off crystal 964. Half wave plate 966 rotates the direction of polarization of a portion of the light from horizontal to vertical. Walk-off crystal 964 combines the vertically polarized light with the horizontally polarized light to provide a depolarized beam containing signals fro channels 1, 5, 9, . . . to collimator 968 and port 970.

The function of the 1 to 4 deinterleaver of FIG. 10a may be briefly stated as follows. A light beam containing signals of channels 1, 2, 3, 4, 5, 6, . . . passes through dispersion compensator 914, through polarization interferometer 922, polarization interferometer 922 having pass bands for channels 1, 2, 3, 4, 5, 6, . . ., and is divided by polarization beam splitter 920 into a beam for even channels and a beam for odd channels. The beam for even channels passes through polarization interferometer 930, polarization interferometer 930 having pass bands for even channels, and is divided by polarization beam splitter 928 into a beam for channels 4, 8, 12, . . . which is then depolarized and outputted, and a beam for channels 2, 6, 10, . . . which is then depolarized and outputted. The beam for odd channels passes from polarization beam splitter 920 to polarization interferometer 956, polarization interferometer 956 having pass bands for odd channels, and is divided by polarization beam splitter 954 into a beam for channels 3, 7, 11, . . . which is then depolarized and outputted, and a beam for channels 1, 5, 9, . . . which is then depolarized and outputted. If the channel spacing in the input beam containing signals of channels 1, 2, 3, 4, 5, . . . is 50 GHz, the channel spacing in each of the four output beams is 200 GHz.

Figure 10B:
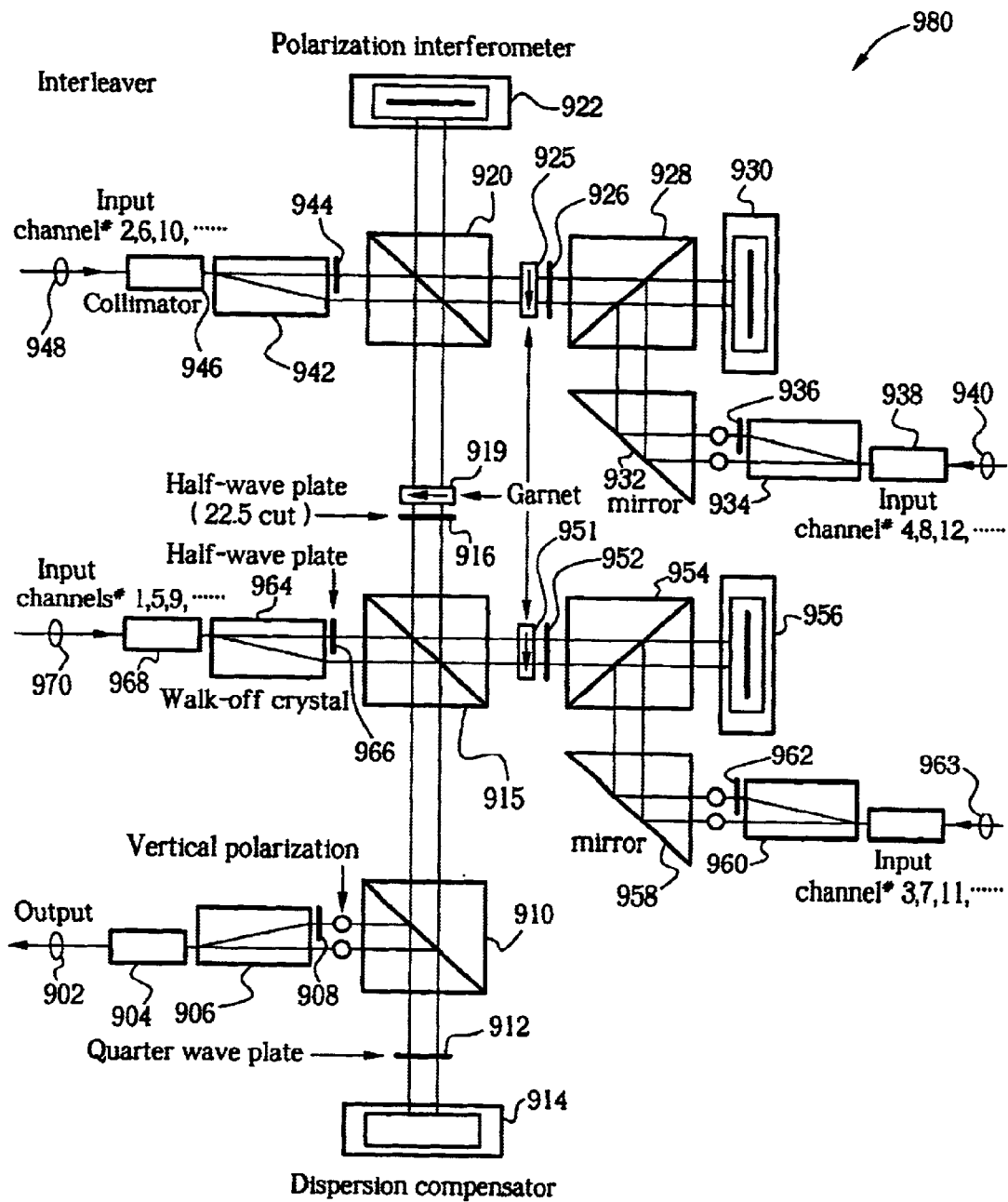
FIG. 10b shows a schematic representation of a 4 to 1 interleaver in accordance with the present invention.

FIG. 10b shows a 4 to 1 interleaver 980 in accordance with the present invention. The 1 to 4 interleaver 980 may be a 200/50 GHz interleaver, for example. In FIG. 10b, it can be seen that interleaver 980 contains the same arrangement of optical components as the deinterleaver of FIG. 10a. In FIG. 10b, the garnets 919, 925 and 951, are rotated 180 degrees about an axis vertical to the plane of the drawing relative to the garnets 916, 924, and 950 in FIG. 10a. Thus, all of the light paths can be reversed so that light containing channels 2, 6, 10 is input at port 948, light containing channels 1, 5, 9 is input at port 970, light containing channels 4, 8, 12 is input at port 940, light containing channels 3, 7, 11 is input at port 963 and the output containing channels 1, 2, 3, 4, 5, is outputted at port 902.

Figure 11A:
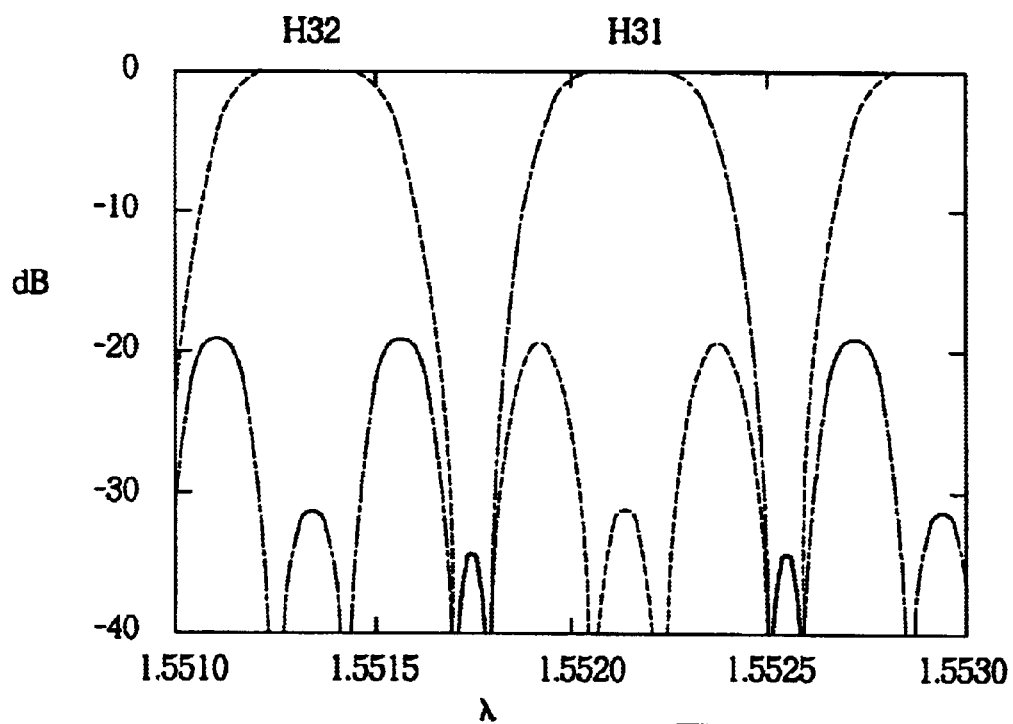
FIGS. 11a and 11b show the output spectrum of a 50/200 GHz deinterleaver in accordance with the present invention.
Figure 11B:
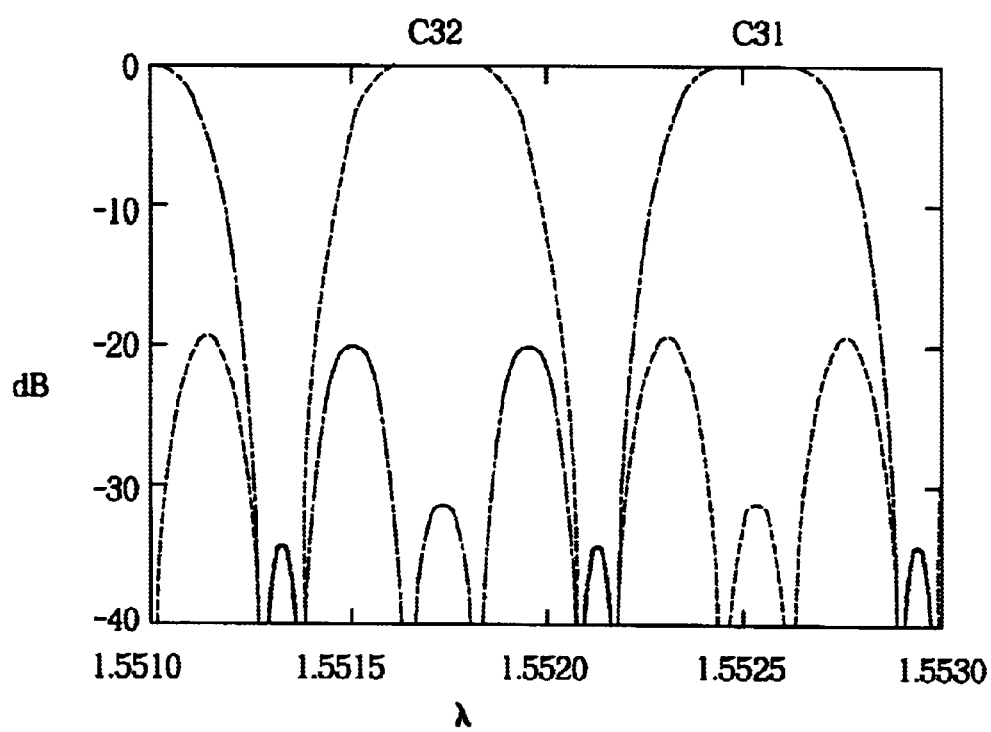

FIGS. 11a and 11b illustrate the output spectrum of a 50/200 GHz deinterleaver with dispersion compensation in accordance with the present invention as illustrated in FIG. 10a. FIGS. 11a and 11b show that the 0.5 dB passband width is 35 GHz and that the −25 dB isolation stopband widths for 50 GHz and 100 GHz adjacent channels are 18.8 GHz and 36 GHz, respectively. According to ITU 100 GHz and 50 GHz Wavelength Standard, the channel "C" is on ITU Grid and represents "even channel" for 50 GHz channel spacing, and the channel "H" is 50 GHz off set from ITU Grid and represents "odd channel" for 50 GHz channels spacing. For example, channel "H31" (λ=1552.12 nm) is odd channel for 50 and 100 GHz channels spacing, channel "H32" (λ=1551.32 nm) is odd channel for 50 GHz channel spacing and is even channel for 100 GHz channel spacing. Channel "C31" (λ=1552.52 nm) is even channel for 50 GHz channel spacing and odd channel for 100 GHz channel spacing, and channel "C32" (λ=1551.72 nm) is even channel for 50 and 100 GHz channel spacing. FIG. 11a shows the odd channels for 50 GHz spacing, channel "H31" is output from output port 970 in FIG. 10a and channel "H32" is output from port 963.

FIG. 11b shows the even channels for 50 GHz spacing. Channel "C31" is output from output port 948 in FIG. 10a and channel "C32" is output from output port 940.

Without dispersion compensation, the dispersion absolute value is larger than 45 ps/nm over 20 GHz passband, and is reduced to less than 10 PS/nm with dispersion compensation in accordance with the present invention.

In comparison to the cascaded deinterleavers of FIG. 2, the 1 to 4 deinterleaver of FIG. 10a has many advantages. The 1 to 4 deinterleaver of FIG. 10a uses much less components than the cascaded arrangement of FIG. 2 and is therefore less costly. The insertion loss may be reduced by about one third. The area occupied by the 1 to 4 deinterleaver of the present invention is much less than that occupied by the cascaded deinterleavers of FIG. 2, and may be as little as one tenth the area of the cascaded deinterleavers because of the absence of looped fibers connecting cascaded deinterleavers. The 1 to 4 deinterleaver of FIG. 10a and the 4 to 1 interleaver of FIG. 10b may also be configured to operate at 12.5/50 GHz, 25/100 GHz and even at 50/400 GHz.

Exemplary embodiments of the present invention have been described herein. These are intended to be illustrative and not restrictive. Thus, the present invention is capable of many variations in detailed implementation, which may be derived from the description contained herein by a person of ordinary skill in the art. All such variations are considered to be within the scope of the appended claims.

What is claimed is:

1. An optical device for interfacing between an optical system in which a light beam contains signals for even and odd channels having channel spacing S, and an optical system in which a light beam contains signals for even channels having channel spacing 2S and a light beam contains signals for odd channels having spacing 2S, the optical device comprising:

a dispersion compensator for providing dispersion compensation for light containing signals for even and odd channels;

a first polarization interferometer having passbands with channel spacing S, the first polarization interferometer providing filtering for light containing signals for even and odd channels;

a second polarization interferometer having passbands with channel spacing S, the second polarization interferometer providing filtering for light containing signals for even channels;

a third polarization interferometer having passbands with channel spacing S, the third polarization interferometer providing filtering for light containing signals for odd channels;

a first port, the first port being for light containing signals for even and odd channels having channel spacing S;

a second port, the second port being for light containing signals for even channels having channel spacing 2S;

a third port, the third port being for light containing odd channels having channel spacing 2S;

first, second, and third polarization beam splitters;

a first polarizer/depolarizer for adding and removing vertical polarization;

a second polarizer/depolarizer for adding and removing horizontal polarization;

a common polarizer/depolarizer for adding and removing horizontal polarization;

a first garnet and a second garnet;

a first half wave plate and a second half wave plate; and a quarter wave plate;

wherein the first port is optically coupled through the dispersion compensator, the first polarization interferometer, and the second polarization interferometer, to the second port so that there is an optical path between the first port and the second port for light containing signals for even channels;

wherein the first port is optically coupled through the dispersion compensator, the first polarization interferometer, and the third polarization interferometer to the third port so that there is an optical path between the first port and the third port for light containing signals for odd channels;

wherein the first port is optically coupled to the dispersion compensator via the first polarizer/depolarizer, the third polarization beam splitter by reflection, and the quarter wave plate;

wherein the dispersion compensator is optically coupled to the first polarization interferometer via the quarter wave plate, the third polarization beam splitter by transmission, the second polarization beam splitter by transmission, the first half wave plate, the first garnet and the first polarization beam splitter by transmission;

wherein the first polarization interferometer is optically coupled to the second polarization interferometer via the first polarization beam splitter by reflection;

wherein the second polarization interferometer is optically coupled to the second port via the first polarization beam splitter by transmission, and the second polarizer/depolarizer;

wherein the first polarization interferometer is optically coupled to the third polarization interferometer via the first polarization beam splitter by transmission, the first garnet, the first half wave plate, the second polarization beam splitter by reflection, the second garnet, and the second half wave plate; and wherein the third polarization interferometer is optically coupled to the third port via the second half wave plate, the second garnet, the second polarization beam splitter by transmission, and the third polarizer/depolarizer.

2. The optical device of claim 1 wherein the device is an optical deinterleaver and wherein the light beam containing even and odd channels is inputted at the first port, the light beam containing even channels is outputted at the second port and the light beam containing odd channels is outputted at the third port.

3. The optical device of claim 1 wherein the device is an optical interleaver and wherein the light beam containing even channels is inputted at the second port, the light beam containing odd channels is inputted at the third port and the light beam containing even and odd channels is outputted at the first port.

4. The optical device of claim 1 wherein each of the first, second, and third polarization interferometers comprises:

a Gires-Tournois interferometer comprising a partially reflective mirror and a highly reflective mirror, wherein the partially reflective mirror faces the highly reflective mirror and there is a space between the partially reflective mirror and the highly reflective mirror, and wherein the partially reflective mirror is a port for a light beam to enter and exit the space between the partially reflective mirror and the highly reflective mirror;

a first phase delay element located in the space between the mirrors; and a second phase delay element located outside the Gires-Tournois interferometer in the path of the light beam, wherein each of the first, second, and third polarization interferometers alters the direction of plane polarization of the light beam containing even channels by ninety degrees.

5. The optical device of claim 4 wherein the first phase delay element is a 45 degree Faraday rotator and the second phase delay element is a 22.5 degree Faraday rotator.

6. The optical device of claim 4 wherein the first phase delay element is a quarter wave plate and the second phase delay element is a one eighth wave plate.

7. The optical device of claim 1 wherein the dispersion compensator is a Gires-Tournois interferometer and wherein the dispersion compensator compensates chromatic dispersion associated with the polarization interferometers.

8. The optical device of claim 1 wherein the channel spacing S is 50 GHz and wherein the performance characteristic of the optical device has a 0.5 dB passband width of 30 GHz and a −25 dB stopband width of 30 GHz.

9. The optical device of claim 1 wherein the first garnet and the second garnet are oriented so the optical device is an optical interleaver, wherein the horizontally polarized light beam containing odd channels passes from the third polarizer/depolarizer through the second polarization beam splitter, through the second garnet and the second half wave plate, emerges from the second half wave plate with horizontal polarization, is reflected by the second polarization interferometer, emerges the second polarization interferometer with horizontal polarization, passes through the second half wave plate and the second garnet, emerges from the second garnet vertically polarized, is reflected by the second polarization beam splitter, passes through the first half wave plate and the first garnet, and emerges from the first garnet horizontally polarized, and so that horizontally polarized light beam containing even and odd channels emerges from the first polarization beam splitter, passes through the first garnet and then the first half wave plate and emerges from the first half wave plate horizontally polarized.

10. The optical device of claim 1 wherein the first garnet and the second garnet are oriented so that the optical device is an optical deinterleaver, wherein horizontally polarized light beam containing even and odd channels passes through the first half wave plate and through the first garnet and emerges from the first garnet with horizontal polarization and passes through the first polarization beam splitter to the first polarization interferometer, and so that a horizontally polarized light beam containing odd channels passes from the first polarization beam splitter through the first garnet and first half wave plate and emerges from the first half wave plate with vertical polarization, is reflected by the second polarization beam splitter, passes through the second garnet and the second half wave plate, emerges from the second half wave plate with horizontal polarization, is reflected by the second polarization interferometer, emerges from the second polarization interferometer with horizontal polarization, passes through the second half wave plate and garnet, and emerges from the second garnet with horizontal polarization, and passes through the second polarization beam splitter to the third port.

11. An optical device for interfacing between an optical system in which a light beam contains a set of channels having channel numbers 1, 2, 3, 4, 5, . . . and having channel spacing S, and an optical system in which a first light beam contains channels 2, 6, 10 . . . having channels spacing 4S, a second light beam contains channels 1, 5, 9 . . . having channel spacing 4S, a third light beam contains channels 4, 8, 12 . . . having channel spacing 4S and a fourth light beam containing channels 3, 7, 11 . . . having channel spacing 4S, the optical device comprising:

a dispersion compensator;

a first polarization interferometer, the first polarization interferometer having passbands for channels 1, 2, 3, 4, 5, 6, 7 . . . wherein the first polarization interferometer alters the direction of polarization of channels 2, 4, 6, 8, 10 . . . by ninety degrees;

a second polarization interferometer that has passbands for channels 2, 4, 6, 8, 10, 12 . . . , and that alters the direction of plane polarization of channels 4, 8, 12, . . . by ninety degrees;

a third polarization interferometer that has passbands for channels 1, 3, 5, 7, 9, 11 . . . , and that alters the direction of plane polarization of channels 3, 7, 11, . . . by ninety degrees;

first, second, third, fourth, and fifth ports for receiving and outputting light; wherein the first port is optically coupled, through the dispersion compensator, the first polarization interferometer, and the second polarization interferometer, in that order, to the second port so that there is provided an optical path for the first light beam between the first port and the second port;

the first port is optically coupled, through the dispersion compensator, the first polarization interferometer, and the third polarization interferometer, in that order, to the third port so that there is provided an optical path for the second light beam between the first port and the third port;

the first port is optically coupled, through the dispersion compensator, the first polarization interferometer, and the second polarization interferometer, in that order, to the fourth port so that there is provided an optical path for the third light beam between the first port and the fourth port;

the first port is optically coupled, through the dispersion compensator, the first polarization interferometer, the third polarization interferometer, in that order, to the fifth port so that there is provided an optical path for the fourth light beam between the first port and the fifth port; and the first port is optically coupled to the dispersion compensator via a collimator, a first polarizer/depolarizer, reflection in a first polarization beam splitter and a quarter wave plate.

12. The optical device of claim 11 wherein the device is a deinterleaver in which the light beam containing channels 1, 2, 3, 4, 5, 6, 7 . . . is inputted at the first port, the first light beam is outputted at the second port, the second light beam is outputted at the third port, the third light beam is outputted at the fourth port and the fourth light beam is outputted at the fifth port.

13. The optical device of claim 11 wherein the device is an interleaver in which the first light beam is inputted at the second port, the second light beam is inputted at the third port, the third light beam is inputted at the fourth port, the fourth light beam is inputted at the fifth port and the light beam containing channels 1, 2, 3, 4 . . . is outputted at the first port.

14. The optical device of claim 11 wherein each of the first, second and third polarization interferometers comprises:
- a Gires-Tournois interferometer comprising a partially reflective mirror and a highly reflective mirror, wherein the partially reflective mirror faces the highly reflective mirror and there is a space between the partially reflective mirror and the highly reflective mirror, and wherein the partially reflective mirror is a port for a light beam to enter and exit the space between the partially reflective mirror and the highly reflective mirror;
- a first phase delay element located in the space between the mirrors; and a second phase delay element located outside the Gires-Tournois interferometer in the path of the light beam.

15. The optical device of claim 14 wherein the first phase delay element is a 45 degree Faraday rotator and the second phase delay element is a 22.5 degree Faraday rotator.

16. The optical device of claim 14 wherein the first phase delay element is a quarter wave plate and the second phase delay element is a one eighth wave plate.

17. The optical device of claim 11 wherein the dispersion compensator is a Gires-Tournois interferometer and wherein the dispersion compensator compensates chromatic dispersion associated with the polarization interferometers.

18. The optical device of claim 11 wherein the channel spacing S is 50 GHz and wherein the channel spacing 4S is 200 GHz.

19. The optical device of claim 11 wherein the dispersion compensator is optically coupled to the first polarization interferometer via the quarter wave plate, transmission through the first polarization beam splitter, transmission through a second polarization beam splitter, a 22.5 cut half wave plate, a garnet and transmission through a third polarization beam splitter.

20. The optical device of claim 19 wherein the first polarization interferometer is optically coupled to the second polarization interferometer via reflection in the third polarization beam splitter, transmission through a second garnet, a second half wave plate, and a fourth polarization beam splitter.

21. The optical device of claim 19 wherein the first polarization interferometer is optically coupled to the second port via transmission through the fourth polarization beam splitter, the second half wave plate, the second garnet, the third polarization beam splitter, and a second polarizer/depolarizer.

22. The optical device of claim 21 wherein the second polarization interferometer is optically coupled to the fourth port via reflection in the fourth polarization beam splitter and transmission through a fourth polarizer/depolarizer.

23. The optical device of claim 22 wherein the first polarization interferometer is optically coupled to the third polarization interferometer via transmission through the third polarization beam splitter, through the first garnet, the first half wave plate, reflection in the second polarization beam splitter, through a third garnet, a third half wave plate and through a fifth polarization beam splitter.

24. The optical device of claim 23 wherein the third polarization beam splitter is optically coupled to the third port through the fifth polarization beam splitter, through the third half wave plate, through the third garnet, through the second polarization beam splitter and through a third polarizer/depolarizer.

25. The optical device of claim 24 wherein the third polarization interferometer is optically coupled to the fifth port via reflection in the fifth polarization beam splitter and through a fifth polarizer/depolarizer.

26. The optical device of claim 11 further comprising:
- first, second, third, fourth, and fifth polarization beam splitters;
- first, second, third, fourth and fifth polarizer/depolarizers;
- first, second, and third garnets;
- a first half wave plate, a second half wave plate, and a third half wave plate; and
- a quarter wave plate; wherein
  - the first port is optically coupled, through the first polarizer/depolarizer, the third polarization beam splitter by reflection, the quarter wave plate; in that order, to the dispersion compensator;
  - the dispersion compensator is optically coupled, through the quarter wave plate, the third polarization beam splitter by transmission, the second polarization beam splitter by transmission, the first half wave plate, the first garnet, the first polarization beam splitter, in that order, to the first polarization interferometer;
  - the first polarization interferometer is optically coupled, through the first polarization beam splitter by reflection, the third garnet, the third half wave plate, and the fourth polarization beam splitter, in that order, to the second polarization interferometer;
  - the first polarization interferometer is optically coupled, through the fourth polarization beam splitter by transmission, the third half wave plate, the third garnet, the first polarization beam splitter by transmission, the first polarizer/depolarizer, in that order, to the first input/output port;
  - the first polarization interferometer is optically coupled, through the fourth polarization beam splitter by reflection to the third input/output port;
  - the common polarization interferometer is optically coupled, through the first polarization beam splitter by transmission, the first garnet, the first half wave plate, the second polarization beam splitter by reflection, the second garnet, the second half wave plate, and the fifth polarization beam splitter by transmission, in that order, to the second polarization interferometer
  - the second polarization interferometer is optically coupled, through the second half wave plate, the second garnet, the second polarization beam splitter by transmission, the second polarizer/depolarizer, in that order, to the second input/output port; and
  - the second polarization interferometer is optically coupled, through the fifth polarization beam splitter to the fourth polarizer/depolarizer.

* * * * *